March 18, 1969 J. S. HAWLEY ET AL 3,434,136
DIGITAL DATA SYSTEM
Filed Aug. 27, 1965
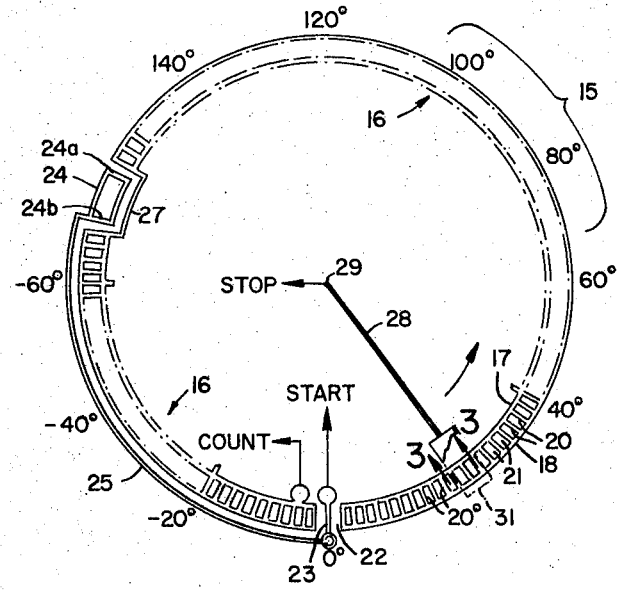
FIG_1
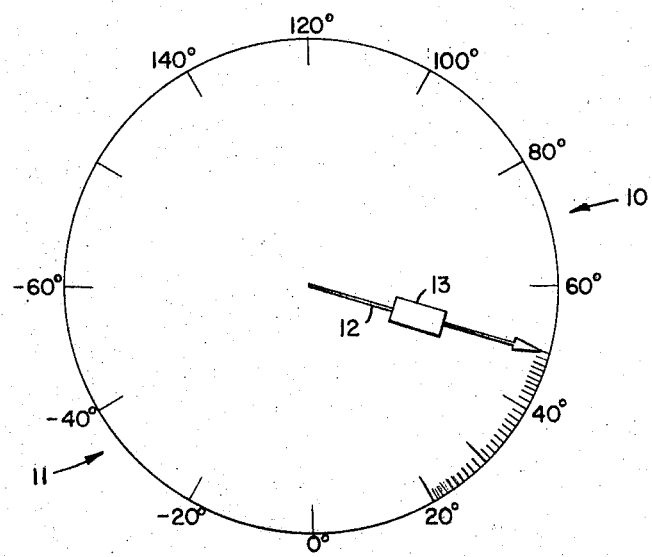
FIG_2
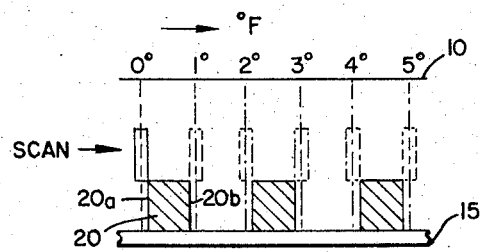
FIG_3
INVENTOR.
JACK S. HAWLEY
BY GEORGE R. TOWNER
ATTORNEYS

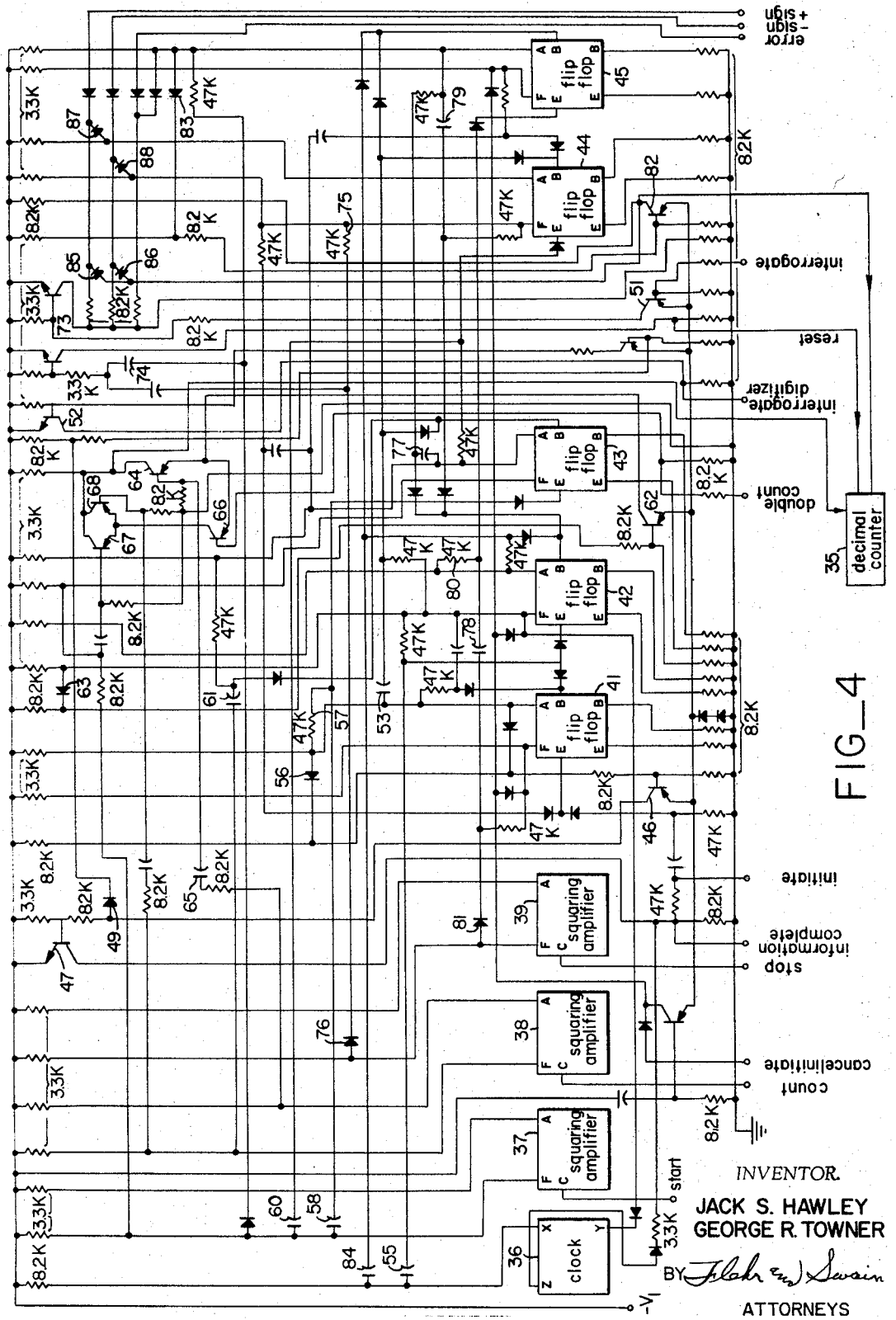

United States Patent Office 3,434,136
Patented Mar. 18, 1969

3,434,136
DIGITAL DATA SYSTEM
Jack S. Hawley, Berkeley, and George R. Towner, Oakland, Calif., assignors to Berkeley Instruments, a corporation of California
Filed Aug. 27, 1965, Ser. No. 483,207
U.S. Cl. 340—347                                6 Claims
Int. Cl. H04l 3/00; H03k 13/02

The present invention is directed to a digital data system and more particularly to a system which converts analog information to digital information.

In the telemetering art it is advantageous to convert analog information to digital information at the remote location and then transmit the digital information either by wire or radio. Since the digital information is less susceptible to interference and degradation, a much more reliable and error-free signal is received at the home station. Such a system is illustrated in a copending application Ser. No. 135,295, filed Aug. 31, 1961, now Patent 3,253,260, in the name of Jack S. Hawley.

However, the range of applications of present day systems of the foregoing type is still limited. For example, when the analog information system has a relatively high information resolution capability or has multiple scales, e.g., plus and minus, present conversion systems are inadequate.

In general, it is an object of the present invention to provide an improved digital data system which overcomes the above named disadvantages.

Another object of the invention is to provide a digital data system of the above character which has an analog to digital converter having improved resolution capability and improved flexibility in converting readings of several different type transducers in a simple and economical manner.

Another object of the invention is to provide a digital data system of the above character which is capable of converting an analog indication having plus and minus values into corresponding digital information.

Another object of the invention is to preserve the linearity of the readout from the digital system while at the same time achieving high resolution.

Additional objects and features of the invention will appear from the following description in which the preferred embodiment is set forth in detail in conjunction with the accompanying drawings.

Referring to the drawings:
FIGURE 1 is a plan view of a portion of the invention showing digitizer means for converting analog information to digital information;
FIGURE 2 is a plan view of another portion of the invention showing the scale and indicator of a thermometer;
FIGURE 3 is an enlarged view of a section of FIGURE 1 taken along line 3—3; and
FIGURE 4 is a circuit diagram of the digital data system embodying the present invention.

Referring first to FIGURE 2, the invention finds preferred use with an analog measuring device such as that shown, which is a thermometer having an index scale with a plus scale portion 10 having a reading from zero to a plus 140° F., as indicated, and a minus scale portion 11 reading from zero to a minus 60° F. An indicator 12 is coupled to the actual transducer or temperature-sensing device and carries on it a mirror 13 whose function will be described below.

FIGURE 1 illustrates, in very schematic form, a portion of the means for converting the analog type information of the thermometer of FIGURE 1 to digital information. More specifically, there is provided an insulating substrate 15 on which is mounted a circular conductive structure 16 which is formed in such a manner that it gives the appearance of a railroad track and is preferably made of copper. It is composed of circular strips 17 and 18 which are connected by perpendicular conductive elements 20. In this manner insulated areas 21 are formed between the elements 20. The conductive structure 16 is not continuous but is also provided with a space 22 in which a start segment 23 is provided which operates to provide a start pulse as hereinafter described. In addition, double start segments 24 having conductive segments 24a and 24b also displaces a portion of conductive elements 20, and is electrically coupled by an auxiliary strip 25 to the single start segment 23. The gap in conductive structure 16 caused by double start segments 24 is filled by a conductive link 27. The conductive structure 16 is provided with an output terminal designated "count"; the single start segment 23 and double start segments 24a and 24b are provided with another output terminal labeled "START."

Scanning means is provided which is responsive both to the location of the respective lines 20, and in addition to the position of the indicator 12 as shown in FIGURE 1, on either the plus or minus scale portions 10, 11. The scanning means includes a rotatable arm 21 which is pivoted at point 29 and has a scanning head 31 mounted on the end of the arm. Arm 28 scans in a counter-clockwise direction and has a path of travel cutting across all of the conductive elements 20 and, in addition, the double start segments 24 and single start segment 23. Scanning head 31 is provided with a brush 31a, illustrated schematically in FIGURE 3, which makes electrical contact with conductive elements 20.

The scanning head 31 is also responsive to the mirror 13 on indicator 12, the entire scale assembly of FIGURE 2 being sandwiched on top of the conductive structure 16 in the manner shown in FIGURE 3. A part of the positive scale portion 10 is illustrated with the degree values being merely nominal and for illustration only. Scanning head 31 includes a light source and detector for sensing the reflected light from mirror 13. When the scan head is over the mirror and associated indicator 12, it senses the location of the indicator and produces a pulse on the terminal designated "STOP."

The invention as thus far described, except for the plus and minus scale portions and the double start segments 24, is essentially similar to the disclosure in the above identified Hawley application. Therefore, the details of the scanning device and the conductive structure 16 will not be described except where specifically relevant to the present invention.

As illustrated in FIGURE 3, the indices of scale portions 10 and 11 of FIGURE 1 have corresponding portions of conductive elements 20 (specifically, the leading and trailing edges 20a and 20b of the conductive means) which portions are spaced from one another distances substantially similar to the spacing of the corresponding indices as shown. When the brush 31a contacts leading edge 20a, a pulse output is provided, the utilization of which will be described below, and similarly brush 31a as it leaves the trailing edge 20b produces another pulse output. Thus, by utilizing the leading and trailing edges of the conductive elements 20, the resolution of the conductive structure 16 which serves as digitizer means to convert the analog data of the temperature scale to digital information, is double to that compared to the resolution of a device which is responsive to only one overall contact with conductive elements 20.

Start segment 23 serves as a reference zero for the digitizer and is located over the corresponding "zero" of the temperature scale of FIGURE 2.

Any statistical bias is removed from the construction of FIGURE 3 by providing that the dimension of the conductive elements 20 lying in the scanning path is less than the corresponding spacing of the indices of scale portions 10 or 11 as illustrated by the dashed lines extending from the indices within which conductive elements 20 are contained. Since brushes 31a have some thickness, the forward edge of the brush when it contacts leading edge 21a forms an output pulse and similarly the backward edge of the brush forms another pulse as it leaves the trailing edge 20b. The error is eliminated by reducing the width of conductive elements 20 a sufficient amount so that the center line of brushes 31a will coincide with their corresponding indices on both contacting the leading edge 20a and leaving the trailing edge 20b.

The present invention also provides means for digitizing the indicator reading on either the plus or minus scale portion 10 or 11. In accomplishing this objective, the digitizer of FIGURE 1 is coupled to a central logic unit, illustrated in FIGURE 4, which is generally responsive to the pulse outputs of the digitizer to selectively count such pulses in such a manner as to yield a direct output reading of the temperature whether it is on the plus or minus scale. It should also be understood at this point that the invention is also capable of responding to any type of transducer which has similar plus and minus indicating capabilities.

The digitzer of FIGURE 1 includes first means comprising the start segment 23 which, as mentioned before, is in the path of the scanning head 31 and is in a portion of the scan which is before the positive scan and after the minus scan. This start segment, in conjunction with the logic unit of FIGURE 4, initiates a count in a decimal counter 35 coupled to the logic unit when it is scanned by scanning head 31 or specifically contacted by the brush 31a at its leading edge; the leading and trailing edges of the subsequent conductive elements 20 produce pulse outputs which are counted until scanning head 31 senses the indicator arm 12 and its mirror 13 which serves to terminate the count.

However, if the indicator is in the negative portion of the scale at the time of scanning, second means is provided which include double start segments 24a and 24b which condition the decimal counter 35 to initiate a count of pulses from the portion of the digitizer corresponding to the minus scale 11 when the scanning head 31 scans indicator 12. Such count is carried on in the same manner as on the plus scale, the leading and trailing edges of the conductive strips producing one count each. The count is terminated when the leading edge 20a of the reference zero or start segment 23 is scanned.

Start segment 23, when the digitizer is counting for the corresponding positive scale portion, also provides a count pulse output on its trailing edge 20b which is counted by the decimal counter 35. However, the same is not true of the double start segments 24 since no count is effective until the indicator is detected by scanning head 31.

All of the above is accomplished with the aid of the central logic unit of FIGURE 4 which is receptive to the initiation of contact of brush 31a with the leading edge 20a of conductive strip 20, and is also responsive to the breaking of contact with trailing edge 20b. This is true of both the count output of the digitizer of FIGURE 1 and the start output, which outputs have corresponding inputs similarly labeled in FIGURE 4 as, start and count, respectively. The third input to the central logic unit is the stop output from the scanning head 31 which is activated when the scanning head senses the mirror 13 on indicator 12.

Referring now specifically to the central logic unit of FIGURE 4, it comprises a uni-junction clock 36, three (3) squaring amplifiers 37, 38, and 39 which may be Schmitt trigger circuits which are respectively coupled to the start, count and stop terminals of the digitizer of FIGURE 1, and flip-flop circuits (bistable multivibrators) 41, 42, 43, 44 and 45. In addition, there are associated gates, amplifying transistors and auxiliary components which will be discussed in detail only where necessary. Before discussing the circuit in detail, the overall function will be described.

Clock 36 provides both a warm-up period for the associated circuits and the digitizer of FIGURE 1 which may be, for example, an interval of .2 second during which time no pulses received from the digitizer are recognized. In addition, a limiting time interval is also provided by the clock of, for example, 1.5 seconds where, if data has not been gathered within this time, (which might occur, for example, if the mirror 13 were to fall off of indicator 12) any further attempts of gathering data will be stopped.

The action of the central logic unit of FIGURE 4 is initiated by placing a ground on the Initiate terminal. This ground most typically will come from either the operator of the system or from a computer programmer which is controlling it. The ground on the Initiate terminal starts the clock 36 and at the end of the predetermined time interval, the central logic unit is receptive to receive start, count, and stop pulses from the digitizer. This is accomplished by the Interrogate Digitizer terminal sending a voltage to the digitizer in order to produce pulses through the count, start, and stop input terminals. Lastly, the central logic unit is made sensitive to the high resolution type of digitizer which produces a pulse on both the leading and trailing edges of its conductive strip 20 by providing a minus voltage on the Double Count input terminal.

As discussed previously, a count of the plus data field 10 of the transducer device of FIGURE 2 is initiated by a single start pulse from start segment 23 through the start terminal, and this count is terminated by the scanning head 31 responding to the indicator mirror 13 thereby sending a pulse through the stop terminal. The decimal counter 35 provides a readout of the temperature and the fact that this is in the plus portion of the scale is indicated by an output designated "+ sign" which is responsive to the single start input.

Similarly, a double start pulse from the segments 24a and 24b condition the central logic unit to start counting upon the reception of a stop pulse and to terminate such count upon the reception of a single start pulse. Again, a "— sign" output indicates that the minus portion of the scale is being counted. Actually, the decimal counter 35 continuously counts pulses from count input after the clock 36 has passed its initial time limit, and is reset from the reset terminal when a count is being initiated.

The data true output of the logic unit is coupled to decimal counter 35 and determines whether or not data should be read from the decimal counter. If such data is not true, in other words, the digitizer and central logic unit have not gone through their data gathering in logical sequence, any output is suppressed. Similarly, the Error output suppresses the plus or minus signs when the data is incorrect.

The central logic unit and decimal counter are adaptable to being coupled to an output device such as a Teletype machine. If such is the actual utilization or indicator device, the Teletype machine would, for example, if there was a false indication on the Data True output, type slashes instead of a numerical value.

When the digitizer has completed its data gathering cycle or a predetermined time has elapsed as determined by clock 36, an information complete signal is produced on the information complete output terminal. This tells the operator or the computer programmer that the decimal counter may now be interrogated. An interrogate signal is placed on the Interrogate input terminal, causing the sign outputs to either read out a true reading accompanied by an appropriate polarity sign or, to read out an Error signal.

Lastly, provision is made through a Cancel Initiate terminal to cancel the initiate signal if desired.

Referring now to the specific circuitry of FIGURE 4, a ground signal on the Initiate terminal sets a flip-flop 41. Flip-flops 41–45 are all of standard design, with the terminals marked E and B being the set and reset inputs, respectively, and the terminals F and A being the outputs of the flip-flop, the F being reset or "zero," and the A being the set output or "1." Ground on the initiate input after setting flip-flop 41 places a minus voltage on output terminal A which is set, thereby removing ground from transistor 46 which in turn turns off a transistor 47. The open impedance condition of transistor 47 removes a clamp voltage from clock 36 which was previously applied to terminal Z through diode 48, thereby permitting the clock to begin its warm-up time interval which, as mentioned previously, may be approximately .2 second.

At the same time the clock is turned on, the Interrogate Digitizer output energizes the digitizer of FIGURE 1 to start the sweep of scanning head 31. This is concurrently accomplished since the turning off of transistor 46 causes the collector coupled diode 49 to conduct, which, in turn, is coupled to the base of a transistor 51 which is turned on. Transistor 51 thereby turns on transistor 52 to provide a negative voltage of $-V_1$ to the Interrogate Digitizer output terminal.

Finally, the set output of flip-flop 41 through terminal A resets through a capacitor 53, flip-flops 43, 44 and 45 through the B reset input terminal. The reset condition is the normal state for these flip-flops at the beginning of operation of the logic unit.

In summary, the setting of flip-flop 41 through the Initiate terminal starts the digitizer giving the scanning arm time to get up to speed, starts the clock which provides a time delay before any pulses from the digitizer are recognized, and, in addition, ensures that flip-flops 43, 44, 45 are placed in the reset position.

At the end of the time delay interval, an output from termianl X of the clock 36 produces a pulse through a capacitor 55 to reset flip-flop 41 and set flip-flop 42. An output voltage is maintained on the Interrogate Digitizer terminal by maintaining transistor 46 off through the set voltage from terminal A of flip-flop 42 which extends through a diode 56 to the base of transistor 46.

A steering resistor 57 is coupled to the output terminal F of squaring amplifier 37 and steers start pulses from the Start terminal to pass through a capacitor 58 to the set input terminal of flip-flop 43, thereby setting the flip-flop. As mentioned previously, the beginning of a negative data region is identified by a pair of start pulses in succession. Where this is the case, the setting of flip-flop 43 allows the second of such pulses to pass through a capacitor 60 which is coupled to the output of the squaring amplifier 37 and set flip-flop 44. The setting of flip-flop 44 signals that data may now be received in the negative data field. If a second start pulse is not received, the next ensuing information pulse from the Count terminal resets flip-flop 43 through squaring amplifier 38 and capacitor 61 which is coupled to the reset input terminal of the flip-flop. In this case flip-flop 44 remains reset (the F terminal energized) signalling that data is now being received in the positive data field.

The setting of flip-flop 42 which was caused by the "tick" from the clock turns on transistor 62 through a diode 63 to permit information pulses appearing on the Count input terminal to appear at the Count Output terminal. When transistor 62 is turned on it supplies emitter current to a transistor 64 to enable it for operation. Thus, when pulses from the Count input are squared by squaring amplifier 38, the output terminal A of the squaring amplifier is coupled to the base of transistor 64 through a capacitor 65. This count pulse occurs when the brush 31a of FIGURE 3 engages the leading edge 20a of conductive means 20.

Where it is desired, as in the present invention, to count the trailing edge of the conductive means as an additional pulse output, a negative voltage is put on the Double Count input to turn on transistor 66 which in turn enables transistors 67 and 68. The enabling of these two transistors serves a double function; first, the trailing edge of start segment 23 provides a data count pulse by coupling the base of transistor 67 through a capacitor 71 to the F output of the start pulse squaring amplifier 37. Furthermore, the information pulses from the Count input which are derived from the trailing edge 20b of strips 20 actuate transistor 68 through its base which is coupled by means of a capacitor 72 to the F output of squaring amplifier 38. Note that leading edge 20a was counted from terminal A of squaring amplifier 38. Turning on either transistor 67 or 68 actuates transistor 64 to produce an output on the Count output terminal.

Thus, the start segment 23 serves a double function of providing an indication of when the positive data field is being scanned and also provides by its trailing edge a count for the Count output. This maintains the linearity of the system by keeping an exact correspondence between the indices of the temperature scale and the leading and trailing edges of the conductive strips 20. In the case of the double start pulse formed by segments 24a and 24b of FIGURE 2, any counting which occurs here is ineffective since the decimal counter 35 is reset when the scanning head detects the indicator in the negative data field.

More specifically, the Reset output is activated by a transistor 73 which when turned on produces a minus voltage on the Reset terminal. When information is being detected in the positive field, a pulse from the F output terminal of "Start" squaring amplifier 37 is coupled to the decimal counter 35 at the digitizer zero point which is the leading edge of start segment 23.

When the negative field is being scanned, a resistor 75 which is coupled to the reset output terminal F, of flip-flop 44 steers a diode 76 so that the pulses from squaring amplifier 39 are effective to turn on transistor 73 to initiate a reset of the counter at this point. It should be noted that squaring amplifier 39 has an output only when the scanning head 31 detects the mirror 13 on the indicator 12. This is the beginning of count for the negative data field. The action of flip-flop 44, which is responsive to the single and double start pulses, thus determines when the decimal counter 35 is reset.

Decimal counter 35 has its count terminated when the enabling transistor 62 is turned off. This occurs when flip-flop 42 is reset which occurs either at the end of the negative data field as a result of the reception of a start pulse from start segment 23, or upon receipt of a stop pulse in the positive data field which is when the scanning head reaches the indicator. At the end of the negative field a start pulse is produced through squaring amplifier 37 which sets flip-flop 43 (since this flip-flop is responsive to alternate start pulses) and, in turn, the pulse from the set terminal A of flip-flop 43 resets flip-flop 42 through the interconnecting capacitor 77. The resetting of flip-flop 42 terminates the counting by turning off the circuit which has been holding transistor 62 on.

In the case of the positive field, the counting is terminated by the reception of a valid stop pulse through squaring amplifier 39 which is coupled to flip-flop 45 through a capacitor 78. This energizes the set terminal E of flip-flop 45 which, in turn, has its set output terminal A coupled through a capacitor 79 to the reset input terminal of flip-flop 42 to again thereby turn off or disable the counting unit by turning off transistor 62. However, flip-flop 45 is responsive only to a valid stop pulse which is a stop pulse that has been received after a start pulse. Accordingly, a resistor 80, which is coupled to the set terminal of flip-flop 42, determines whether or not flip-flop 45 is to be set. Resistor 80 steers the diode 81 which is coupled to the F terminal of squaring amplifier 39 so that a stop pulse will be conducted through to flip-flop 45 only if flip-flop 42 is in its normally set condition which will be the case if a start pulse has previously been received.

The data true output determines whether data should be read out from the decimal counter 35. Unless a normally on transistor 82 is turned off by a signal through diode 83, a ground signal on the data true output will prevent the decimal counter from reading out. The turning off of transistor 82 is provided by the setting or turning on of terminal A of flip-flop 45 which is coupled to diode 83. As stated previously, the setting of flip-flop 45 is controlled by flip-flop 42. Clock 36 provides a termination "tick" at, for example, approximately 1.5 seconds through a capacitor 84 to the reset terminal of flip-flop 42. Thus, if by this time flip-flop 45 has not been set, the data true output instructs the decimal counter 35 not to read out. Errors are also indicated by the same mechanism on the + and − sign outputs on the Error terminal by transistor 82 suppressing an output on both the plus sign or minus sign means of diodes 85, 86 and producing an output on the Error terminal. Normally, the indication of a plus or minus data field is determined by the flip-flop 44 which, as mentioned previously, indicates what data gathering field the digitizer is in. More specifically, the set terminal A of flip-flop 44 conducts through a diode 87 to produce an output on the plus sign terminal and, conversely, an output on the reset terminal F produces conduction through diode 88 to produce an output on the minus sign terminal.

The circuit of FIGURE 4 has been constructed and the value of all components are as indicated; resistors in ohms and capacitors in microfarads. All diodes are Transitron #SG–984 and all transistors are 2N404. The operating voltage, $-V_1$, is $-12$ volts.

In summary, the present invention, therefore, provides a digital data system which is capable of converting an analog indication having plus and minus values into digital information, provides a system having improved resolution, all the while preserving the linearity of the digital readout.

We claim:
1. A digital data system comprising:
 (a) an analog measuring device having scale indices and an indicator for such indices;
 (b) scanning means responsive to said position of said indicator on said scale;
 (c) digitizer means having a plurality of pulse output means substantially equal in number and corresponding to said indices of said scale and spaced from one another by distances substantially similar to the spacing of corresponding indices, said pulse output means comprising a substrate formed of insulating material, a plurality of separate conductive elements having leading and trailing edges on said substrate in the path of movement of said scanning means, said scanning means including means whereby the leading edge of each of said conductive elements provides one pulse output and the trailing edge of each of said conductive elements provides another pulse output and
 (d) counting means responsive to said plurality of pulse output means for counting pulses therefrom.

2. A digital data system as in claim 1 wherein said scanning means includes brush means for making electrical contact with said conductive elements and where the dimension of said conductive elements coinciding with the path of movement of said scanning means is less than the similar spacing of corresponding indices thereby compensating for the thickness of said brush means.

3. A digital data system comprising:
 (a) an analog measuring device having scale indices and an indicator for such indices, such scale forming a substantially closed loop having plus and minus portions, each portion with an upper and lower limit, the lower limit of each scale being located at a common reference zero;
 (b) scanning means responsive to said position of said indicator on said scale;
 (c) digitizer means having a plurality of pulse output means substantially equal in number and corresponding to said indices of said scale and spaced from one another by distances substantially similar to the spacing of corresponding indices, said pulse output means comprising a substrate of insulating material, a plurality of separate conductive elements on said substrate in the path of movement of said scanning means, said elements forming a closed loop similar to said scale loop, said scanning means being responsive to the location of said conductive elements;
 (d) counting means responsive to said plurality of pulse output means for counting pulses therefrom, and
 (e) first start means having a portion thereof positioned on said substrate in said path of movement of said scanning means at a location corresponding to said reference zero of said scale, and second start means having a portion thereof positioned on said substrate in said path of movement of said scanning means between said conductive elements corresponding to said upper limits of said plus and minus scale portions, said first start means initiating a count in said counting means of pulses from conductive elements corresponding to said plus scale portion when said scanning means scans said first start means, such count being terminated when said scanning means senses said indicator, and said second means conditioning said counting means when said scanning means scans said second start means to initiate a count of pulses from conductive elements corresponding to said minus scale portion when said scanning means scans said indicator, such count being terminated when said first start means is scanned.

4. A digital data system as in claim 3 in which said first start means also provides a pulse output which is counted by said counting means.

5. A digital data system comprising:
 (a) an analog measuring device having scale indices and an indicator for such indices, such scale forming a substantially closed loop having plus and minus portions, each portion with an upper and lower limit, the lower limit of each scale being located at a common reference zero;
 (b) scanning means responsive to said position of said indicator on said scale;
 (c) digitizer means having a plurality of pulse output means substantially equal in number and corresponding to said indices of said scale and spaced from one another by distances substantially similar to the spacing of corresponding indices, said pulse output means comprising a substrate formed of insulating material, a plurality of separate conductive elements having leading and trailing edges on said substrate in the path of movement of said scanning means, said scanning means including means whereby the leading edge of each of said conductive elements provides one pulse output and the trailing edge of each of said conductive elements provides another pulse output;
 (d) counting means responsive to said plurality of pulse output means for counting pulses therefrom, and
 (e) first start means having a portion thereof positioned on said substrate in said path of movement of said scanning means at a location corresponding to said reference zero of said scale and, second start means having a portion thereof positioned on said substrate in said path of movement of said scanning means between said conductive elements corresponding to said upper limits of said plus and minus scale portions, said first start means initiating a count in said counting means of pulses from conductive elements corresponding to said plus scale portion when said scanning means scans said first start means, such count being terminated when said scanning means senses said indicator, and said second means conditioning said counting means when said scanning means scans said second start means to initiate a count of pulses from conductive elements corresponding to said minus scale portion when said scanning means scans said indicator, such count being terminated when said first start means is scanned.

6. A digital data system as in claim 5 in which said positioned portion of said first means is conductive and has leading and trailing edges in said path of movement of said scanning means, said leading edge initiating said count and serving as said reference zero and said trailing edge providing a pulse output which is counted by said counting means.

References Cited

UNITED STATES PATENTS

| | | | |
|---|---|---|---|
| 3,050,718 | 8/1962 | Giel | 340—347 |
| 3,205,489 | 9/1965 | O'Maley | 340—347 |
| 3,349,325 | 10/1967 | Bajars | 340—347 |

MAYNARD R. WILBUR, *Primary Examiner.*

W. KOPACZ, *Assistant Examiner.*

U.S. Cl. X.R.

340—266